(12) United States Patent
Hill

(10) Patent No.: US 6,471,744 B1
(45) Date of Patent: Oct. 29, 2002

(54) VACUUM-PRESSURE SWING ABSORPTION FRACTIONATOR AND METHOD OF USING THE SAME

(75) Inventor: Theodore B. Hill, San Diego, CA (US)

(73) Assignee: SeQual Technologies, Inc., San Diego, CA (US)

( * ) Notice: Subject to any disclaimer, the term of this patent is extended or adjusted under 35 U.S.C. 154(b) by 0 days.

(21) Appl. No.: 09/931,966

(22) Filed: Aug. 16, 2001

(51) Int. Cl.[7] .............................................. B01D 53/053
(52) U.S. Cl. ............................... 95/19; 95/101; 95/102; 95/105; 95/130; 96/113; 96/124; 96/130; 96/142; 96/143
(58) Field of Search ....................... 95/96–98, 100–105, 95/130, 19, 21, 22; 96/108, 130, 143, 144

(56) References Cited

U.S. PATENT DOCUMENTS

| | | |
|---|---|---|
| 3,923,477 A | 12/1975 | Armond et al. |
| 4,000,990 A | 1/1977 | Bingham |
| 4,065,272 A | 12/1977 | Armond |
| 4,449,990 A * | 5/1984 | Tedford, Jr. ............... 95/102 X |
| 4,848,985 A * | 7/1989 | Sadkowski .................. 95/100 |
| 5,074,892 A | 12/1991 | Leavitt |
| 5,156,657 A * | 10/1992 | Jain et al. ..................... 95/101 |
| 5,268,021 A | 12/1993 | Hill et al. |
| 5,411,578 A * | 5/1995 | Watson et al. ................ 95/101 |
| 5,413,625 A | 5/1995 | Chao et al. |
| 5,415,683 A | 5/1995 | Leavitt |
| 5,429,666 A * | 7/1995 | Agrawal et al. .............. 95/101 |
| RE35,099 E * | 11/1995 | Hill ............................... 95/98 |
| 5,540,758 A * | 7/1996 | Agrawal et al. .............. 95/101 |
| 5,871,565 A * | 2/1999 | Leavitt ..................... 95/101 X |
| 5,882,380 A * | 3/1999 | Sircar ....................... 95/100 X |
| 6,068,680 A * | 5/2000 | Kulish et al. .................. 95/98 |
| 6,143,056 A | 11/2000 | Smolarek et al. |
| 6,344,069 B2 * | 2/2002 | Smolarek et al. ......... 95/101 X |

* cited by examiner

Primary Examiner—Robert H. Spitzer
(74) Attorney, Agent, or Firm—Procopio, Cory, Hargreaves & Savitch, LLP

(57) ABSTRACT

The present invention involves a vacuum-pressure swing adsorption process for the separation of components of a fluid mixture. The process includes (a) transferring a fluid mixture through an adsorbent bed at an elevated pressure $P_h$ so as to produce a purified product fluid; (b) venting the adsorbent bed down to an ambient fluid pressure $P_a$; (c) applying a vacuum force to the adsorbent bed to bring the adsorbent bed to a reduced pressure $P_l$; and (d) venting the adsorbent bed up to an ambient fluid pressure $P_a$.

59 Claims, 10 Drawing Sheets

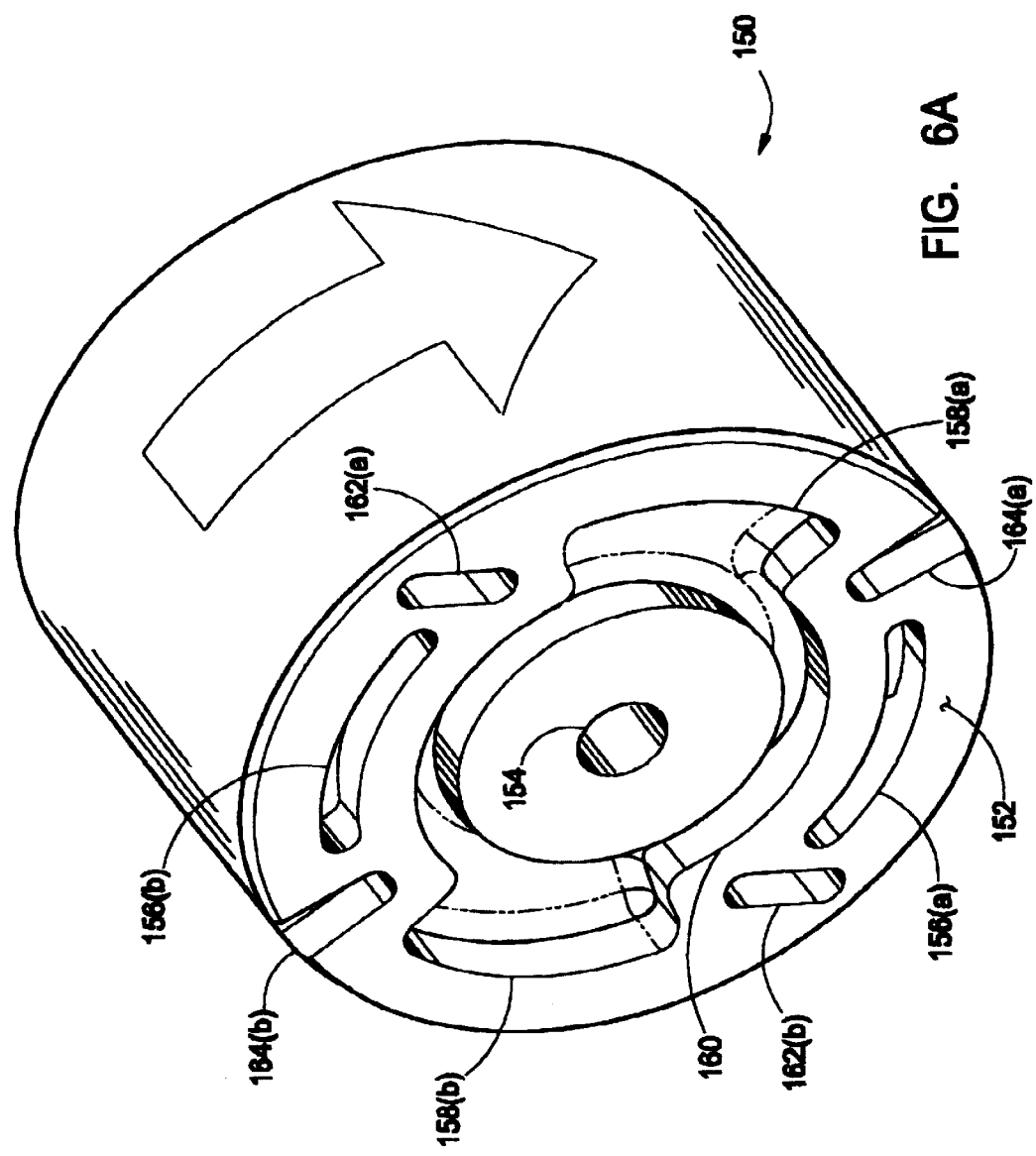

VACUUM-PRESSURE SWING ABSORPTION FRACTIONATOR AND METHOD OF USING THE SAME

FIELD OF THE INVENTION:

This invention relates to vacuum-pressure swing adsorption (VPSA) fractionators and methods.

BACKGROUND OF THE INVENTION:

With the advent of new adsorbent technology for the separation of nitrogen from oxygen, it has proven advantageous to operate air separation plants with a vacuum-pressure swing adsorption ("VPSA") cycle. The vacuum-pressure swing cycle can give better recovery and specific product compared to pressure swing only or vacuum swing only.

U.S. Pat. No. 5,074,892 ("892") discloses a VPSA cycle and compares the VPSA cycle with various parameters and adsorbents to the PSA cycle. It is shown that low pressure ratios in combination with highly lithium exchanged zeolite molecular sieves can yield lower input power and better productivity than other cycle and adsorbent combinations for large industrial systems (15 ton-per-day oxygen production). The definition of pressure ratio is the ratio of the peak adsorption pressure ($P_h$) to the minimum desorption pressure ($P_l$). Of course, these pressures must be in terms of absolute pressure.

Despite the very good recovery factors vacuum-pressure swing cycles can achieve, they still require too much input work to compress the feed gas and/or evacuate the waste gas to make them practical in smaller concentrators such as portable oxygen concentrators. For instance, in the case of a small, portable oxygen concentrator for medical use such as that described in U.S. patent application Ser. No. 09/632,099, filed Aug. 3, 2000, which is hereby incorporated by reference as though set forth in full, it is desirable to minimize the power required for compression and evacuation so that the concentrator can have a greater operating duration with a fixed mass of battery pack.

Other VPSA systems such as stationary VPSA systems could also benefit from a development that reduced the power required for compression and evacuation.

U.S. Pat. No. 5,415,683 ("683") describes a VPSA system for the production of oxygen from air including a discrete valving scheme. A sequence of six process steps is claimed including a vent-down (or counter-current depressurization to an intermediate pressure) and a product gas repressurization to an intermediate pressure.

U.S. Pat. No. 3,923,477 ("477") describes a VPSA system including a discrete valving scheme that allows for a vent-down step after a fluid mixture is supplied to an adsorbent bed so as to produce a purified product fluid. In the vent-down step, the valving scheme causes the feed end of the adsorbent bed to communicate with the ambient so that the adsorbent bed is vented down to an intermediate level, atmospheric pressure, between filling the adsorbent bed and evacuating the adsorbent bed. The '477 patent does not provide for a vent-up step between evacuating the adsorbent bed and filling the adsorbent bed. Instead the '477 patent provides for back-fill from the product reservoir or from an adjacent bed to raise the pressure in the adsorbent bed to an intermediate level.

U.S. Pat. No. 4,000,990 ("990") describes an apparatus similar to the '477 patent in that a vent-down step, but no vent-up step, is provided. Instead of a vent-up step, the '090 patent describes repressurizing the adsorbent bed with product gas.

U.S. Pat. No. 4,065,272 ("272") describes an apparatus similar to the '477 patent in that a vent-down step, but no vent-up step, is provided. Instead of a vent-up step, the '272 patent describes back filling the adsorbent bed with product gas.

All of the prior art systems are undesirable for four reasons.

1. These prior art systems all use fluid that has been supplied by the compressor to fill the adsorbent bed. They may use some percentage of product gas for filling the product bed, but this fluid has also been through the compressor and had its pressure raised. With the present invention, it is possible to partially fill the adsorbent bed for "free" with fluid supplied strictly from the ambient and not requiring any compression work.
2. The valving, piping and manifolding of the prior art schemes are more complex and costly.
3. Some of the prior art schemes require valving at the product end of the adsorbent beds that connects to the feed end of the adsorbent beds. This type of valving is prone to leakage of the feed gas into the product gas and thus directly impacts the purity of the product gas.
4. The prior art requires a larger proportion of product gas to back fill the adsorbent bed and hence may limit the recovery or productivity of these systems.

SUMMARY OF THE INVENTION

Accordingly, an aspect of the present invention involves a vacuum-pressure swing adsorption process for the separation of components of a fluid mixture where a vent-up step is provided. The vent-up step reduces the amount of feed fluid handled by the compressor, reducing the power consumed in the process. Also, a vent-down step, as known in the prior art, is provided as part of the present invention. The vent-down step reduces the amount of waste fluid handled by the vacuum pump, further reducing the power consumed in the process. An exemplary VPSA process cycle includes (a) transferring a fluid mixture through an adsorbent bed at an elevated pressure $P_h$ so as to produce a purified product fluid; (b) venting the adsorbent bed down to an ambient fluid pressure $P_a$; (c) applying a vacuum force to the adsorbent bed to bring the adsorbent bed to a reduced pressure $P_l$; and (d) venting the adsorbent bed up to an ambient fluid pressure $P_a$.

Another aspect of the present invention involves a vacuum-pressure swing adsorption system for the separation of components of a fluid mixture. The system includes a plurality of adsorbent beds and a valve assembly to provide valving action to transfer a fluid mixture through each adsorbent bed at an elevated pressure $P_h$ so as to produce a purified product fluid, vent the adsorbent bed down to an ambient fluid pressure $P_a$, cause a vacuum force to be applied to the adsorbent bed to bring the adsorbent bed to a reduced pressure $P_l$, and vent the adsorbent bed up to an ambient fluid pressure $P_a$. In a preferred implementation of this aspect of the invention, a rotary valve assembly, especially a face-seal type rotary valve assembly is used. The rotary valve assembly greatly simplifies the routing of fluid flows while packing the fluid distribution function into a very small space. The rotary valve assembly also uses very little power and is known to have very high reliability.

These and other further objects and advantages will be apparent to those skilled in the art in connection with the drawings and the detailed description of the preferred embodiments set forth below.

BRIEF DESCRIPTION OF THE DRAWINGS

The drawings illustrate both the design and utility of preferred embodiments of the present invention, wherein:

FIG. 6A is a bottom perspective view of an embodiment of a rotor shoe of the rotary distribution valve assembly;

DESCRIPTION OF THE PREFERRED EMBODIMENTS

Figure 1:
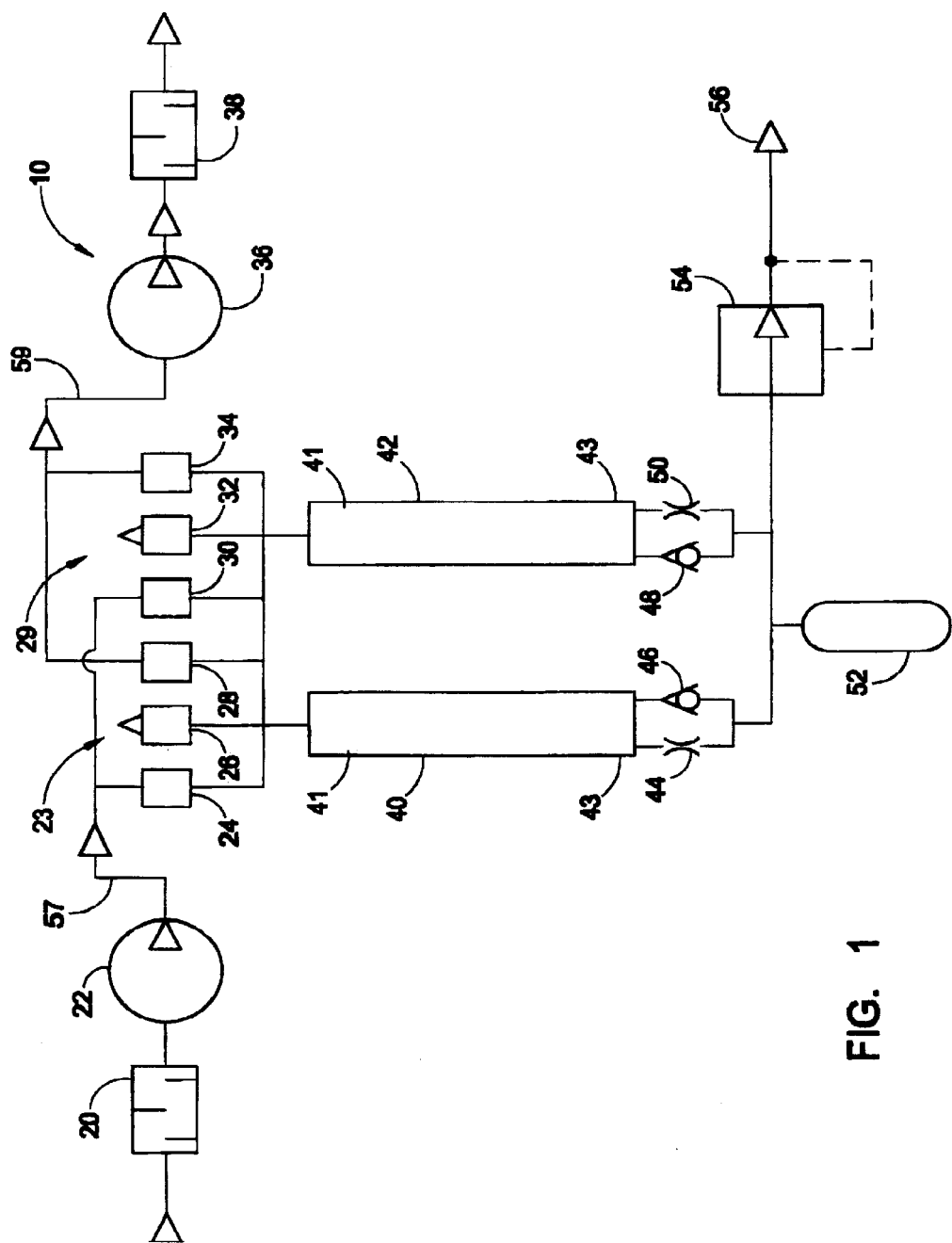
FIG. 1 is a schematic representation of a vacuum-pressure swing adsorption ("VPSA") system constructed in accordance with an embodiment of the invention.

With reference to FIG. 1, a vacuum pressure swing adsorption ("VPSA") system 10 constructed in accordance with an embodiment of the invention will now be described. The VPSA system 10 is a discrete valve system and is used to fractionate fluids.

As used herein the term "fluids" includes both gases and liquids. Although the present invention will be described in conjunction with the separation of oxygen from air, the present invention applies to the fractionation of other fluids such as, but not by way of limitation, the separation of nitrogen from air or the separation of hydrogen from reformer gas.

Further, although the present invention will be described in conjunction with a VPSA system, the invention may be used in other systems where there is a large feed fluid reservoir at some pressure $P_a$ that waste gas may be dumped into. The most common uses are atmospheric separations, but other separations are possible. The only requirements are for there to be three relative pressure levels, $P_h$, $P_a$ and $P_l$. Their absolute level relative to standard atmospheric pressure does not matter.

The discrete valve VPSA system 10 includes a compressor inlet muffler/filter 20 through which air is drawn by a compressor 22 to a first feed end valve assembly 23. The first feed end valve assembly 23 may include the following 2-way valves: inlet valve 24, vent valve 26, and vacuum valve 28. A second valve assembly 29 includes inlet valve 30, vent valve 32, and vacuum valve 34. A vacuum pump 36 is connected to the vacuum valves 28, 34 and expels exhaust fluid through an exhaust muffler 38. The compressor 22 and the vacuum pump 36 are preferably integrated and operate from a single motor.

A pair of adsorbent beds 40, 42 communicate at feed ends 41 with the valve assemblies 23, 29 and at product ends 43 with a first orifice 44 and check valve 46, and a second orifice 50 and check valve 48. In alternative embodiments, no orifices 44, 50 are present at the product ends 43 or the orifices 44, 50 and check valves 46, 48 are replaced with one or more discrete valve assemblies or other valve assembly (e.g., rotary valve assembly). The orifices and check valves control the flow of product fluid to a product reservoir 52 and a reducing regulator 54. Product gas flows out of the system 10 at a product outlet 56. Although a pair of adsorbent beds 40, 42 are shown, in alternative embodiments, the number of adsorbent beds may be greater than two.

Figure 2:
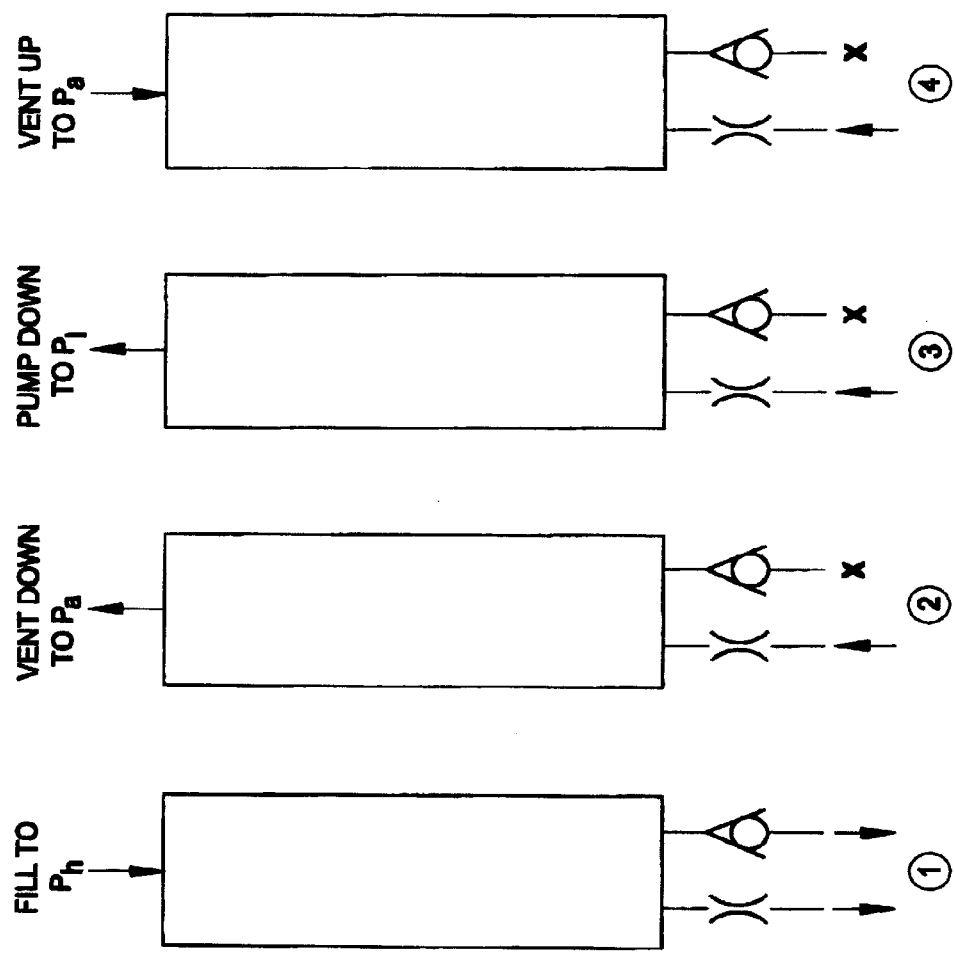
FIG. 2 illustrates four steps of an exemplary VPSA process that may occur using the VPSA system illustrated in FIG. 1 or FIG. 4 discussed below.

With reference additionally to FIG. 2, an exemplary VPSA process that may be run on the system 10 will now be described. Air (or another fluid mixture) is brought into the system 10 through the compressor inlet muffler/filter 20 and then enters the compressor 22. The compressor 22 raises the fluid mixture pressure from ambient pressure $P_a$, which is preferably atmospheric pressure, to an elevated or high pressure $P_b$. The compressed fluid mixture is directed to two-way inlet valves 24, 30. For process step 1 (FIG. 2) to occur in adsorbent bed 40, valve 24 will open and allow the flow of the compressed fluid mixture into the adsorbent bed 40. Purified product fluid will flow out of the adsorbent bed 40, predominantly through the check valve 46 and a portion through the orifice 44.

Product fluid flows through the pressure-reducing regulator 54 to the product outlet 56. Some of the product fluid will pressurize the product reservoir 52. The product reservoir 52 serves as a source for purge flow for the adsorbent bed 42. Purge flow is metered into the adsorbent bed 42 through the orifice 50.

While process step 1 is occurring in adsorbent bed 40, process step 3 (FIG. 2) is occurring in adsorbent bed 42. Valve 34 is open allowing the connection of the adsorbent bed 42 to the vacuum pump 36. In a two adsorbent bed system as shown in FIG. 1, the adsorbent beds 40, 42 are always 180 degrees out of phase.

After a certain period of time, process step 1 is completed in adsorbent bed 40 and the system transitions to the next process step. The length of the process step 1 is set by the occurrence of break-through in the adsorbent bed 40, i.e., duration of time for an impurity to break-through to the product end of the adsorbent bed. The length of time of the process step 1 is preferably set to be just shorter than the breakthrough time.

At the start of process step 2, the valve 24 closes and two-way valve 26 opens. Valve 26 connects the adsorbent bed 40 to the ambient fluid at ambient pressure $P_a$. Because of the elevated pressure, $P_l$, in the adsorbent bed 40, flow from the adsorbent bed 40 to the ambient occurs. This portion of the cycle is continued only until the pressure in the adsorbent bed 40 approaches the ambient pressure $P_a$. Simultaneous with the vent flow out valve 26, product purge flow enters the adsorbent bed through the orifice 44. In an alternative embodiment, there may be no purging, and hence no requirement for orifices 44 and 50.

Simultaneously, in the adsorbent bed 42, process step 4 is underway. Valve 32 is open, allowing flow from ambient into the adsorbent bed 42 that starts at the low pressure $P_l$.

Once pressures in both adsorbent beds 40, 42 approach ambient pressure $P_a$, process step 2 is completed in adsorbent bed 40 and the system transitions to the next step.

At the start of process step 3, the valve 26 closes and the two-way valve 28 opens. Valve 28 connects the adsorbent bed 40 to the vacuum pump 36. Vacuum pump 36 reduces the pressure in the adsorbent bed 40 to low pressure $P_l$. Fluid evacuated from the adsorbent bed 40 by the vacuum pump 36 is discharged to the ambient through the vacuum pump exhaust muffler 38. Product purge flow will continue to flow through the orifice 44 into the adsorbent bed 40. As mentioned above, in an alternative embodiment, there may be no purge flow. The duration of process step 3 is set to be the same as the duration of process step 1. Adsorbent bed 42 undergoes process step 1 while adsorbent bed 40 is in process step 3. At the completion of process step 3, the adsorbent bed 40 is regenerated and prepared for another adsorption cycle.

At the start of process step 4, the valve 28 closes and valve 26 opens. Valve 26 allows ambient fluid at ambient pressure $P_a$ to fill the adsorbent bed 40. Product flows into the adsorbent bed 40 through the orifice 44 as well, pre-filling the product end of the adsorbent bed with high purity fluid. The adsorbent bed 42 is 180 degrees out of phase and process step 2 is occurring in that bed. Upon completion of process step 4 in adsorbent bed 40, the cycle is complete and begins again with process step 1.

Figure 3:
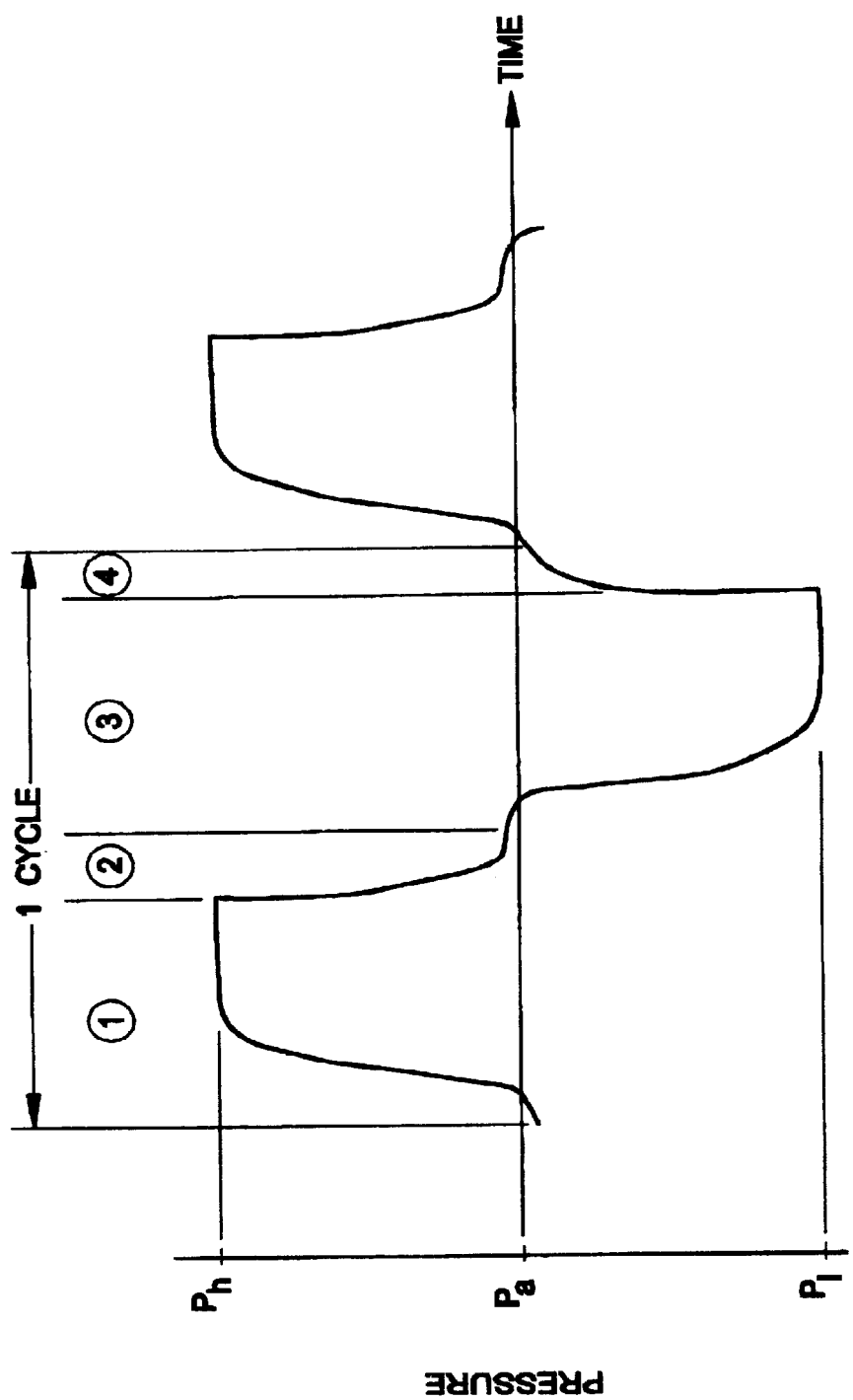
FIG. 3 is a graph showing the pressure in an adsorbent bed as a function of time for each step of the VPSA process shown in FIG. 2.

FIG. 3 shows graphically the pressure level in an adsorbent bed as a function of time. The four process steps 1–4 are identified on the graph.

It should be clear to one skilled in the art that the two banks of three two-way valves (24, 26, 28 and 30, 32, 34) connected to each of the adsorbent-beds can be replaced with two four-way, three position, spring centered valves.

The preferred embodiment of the present invention is to couple the compressor and vacuum pump together with one driving motor. This reduces system size and complexity. It should also be clear to one skilled in the art that the compressor and vacuum pump may run continuously throughout the cycle. Since process steps 2 and 4 are relatively short it will not pose a problem for the compressor and vacuum pump to continue operation with their outlet and inlet respectively shut off for a brief duration. The internal volume of the compressor discharge line 57 and the vacuum pump inlet line 59 can be sized so as to buffer the compressor and vacuum pump during process steps 2 and 4 so that no extreme pressure levels are obtained.

Another solution that wholly avoids extreme pressure levels during process steps 2 and 4 is to increase the number of adsorbent beds to greater than two. It has been found by the inventor that twelve adsorbent beds operating in a PSA cycle makes for a substantially steady state output pressure from a compressor. This effect is described in U.S. Pat. No. 5,268,021 to Hill, et al. which is incorporated by reference as though set forth in full.

Control of the complete process can be based on either time intervals or on pressure levels. The time interval based control scheme is programmed to have constant time intervals for each process step. The pressure level control scheme causes process steps to occur when certain pressure levels are obtained at key locations in the system. For example, one or more pressure sensors may be located at or near the feed ends 41 and/or product end 43 of one or more beds. The valve assemblies 23, 29 may be controlled by a controller based on the pressure sensed.

Figure 4:
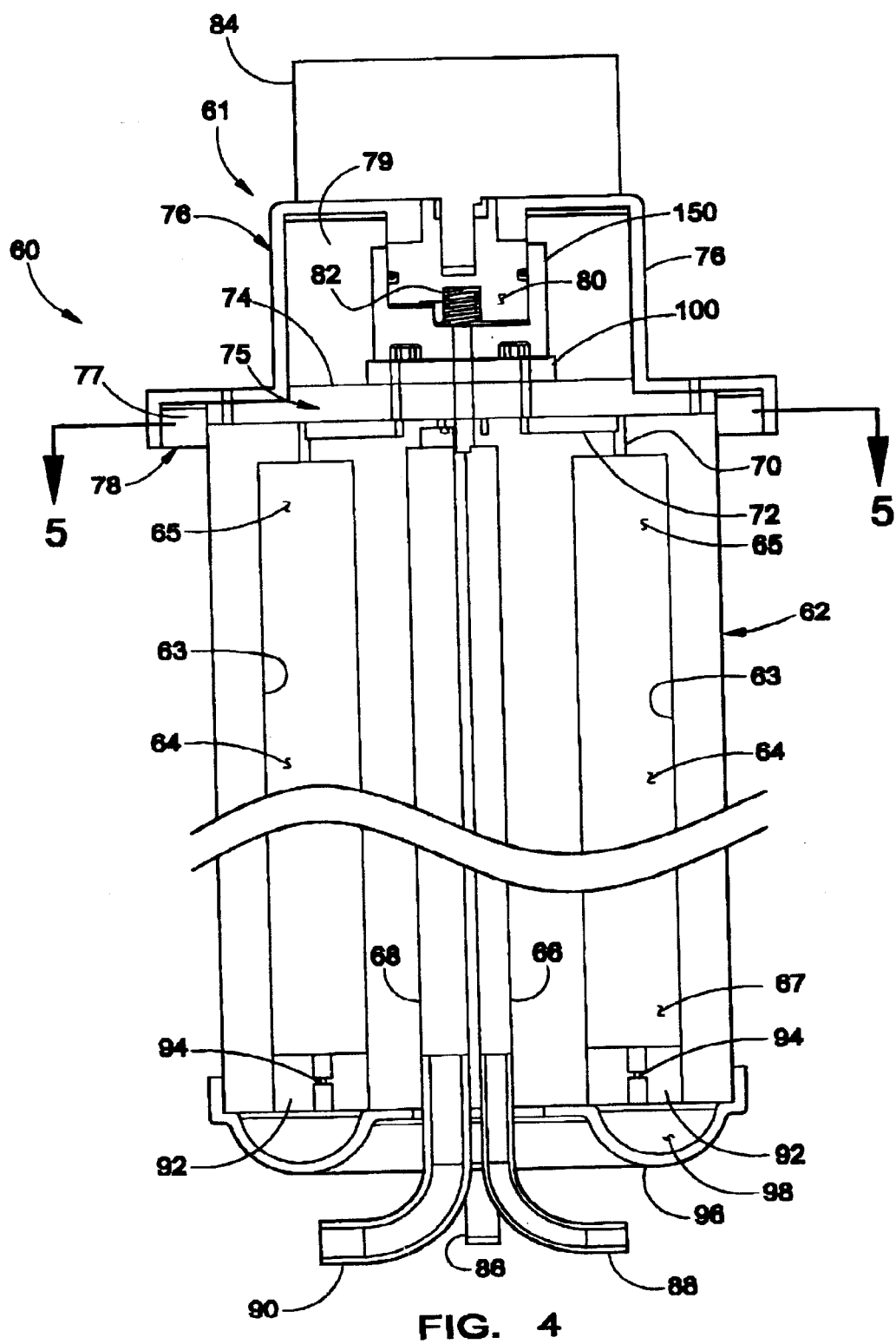
FIG. 4 is a longitudinal sectional view of a VPSA system constructed in accordance with an additional embodiment of the invention taken along lines 4—4 of FIG. 5.

Although the VPSA system and method has been described in conjunction with a discrete valve assembly, other types of valve assemblies with valves located in different locations than that shown in FIG. 1 may be used. For example, with reference to FIG. 4, a VPSA system 60 including a rotary valve assembly 61 will now be described. A VPSA system with a rotary valve assembly is preferred over other valve assemblies because a rotary valve assembly greatly simplifies the routing of fluid flows while packing the fluid distribution function into a very small space. The rotary valve assembly also uses very little power and has very high reliability.

The VPSA system 60 is generally cylindrical in shape and is compact, preferably about 3 inches in diameter and about 6 to 8 inches long. In a preferred implementation, the VPSA system 60 is part of a portable oxygen concentrator. The system 60 is preferably capable of delivering oxygen gas at a flow rate of up to 3 LPM, and at a purity better than 90%.

The system 60 preferably includes a monolithic adsorbent bed body 62 molded of plastic resin. The adsorbent bed body 62 could alternately be made by extrusion, casting, machining or the like and could alternately be made from lightweight metal. The body 62 includes multiple receptacles or cavities 63 for carrying adsorbent beds 64.

The adsorbent beds 64 include a packed particulate adsorbent that preferentially adsorbs nitrogen relative to oxygen in the feed air so that oxygen is produced as the non-adsorbed product gas. An example of a sieve material that may be used in the beds 64 is described in U.S. Pat. No. 5,413,625 to Chao, et al., which is incorporated by reference as though set forth in full. The sieve material may be a Lithium-X Zeolite (Li-X) that allows for a high exchange of Lithium ions. The bead size may, for example, be 0.2–0.6 mm. Alternately, the zeolite may be in a monolithic form rather than in a packed particle bed. For example, the zeolite could be coated on a thin foil or paper and rolled up to form a monolith. Another sieve material that may be used is Calcium-X (Ca-X). In an alternative embodiment, the adsorbent beds 64 may be layered to guard against water vapor intrusion on the Li-X sieve material. For example, the adsorbent bed 64 may include a top layer of activated alumina, silica gel, or Sodium-X molecular sieve material near a feed end 65 of the adsorbent bed 64 and a bottom Li-X sieve material layer. The top layer adsorbs and desorbs water with each pressure swing in the adsorbent bed 64 and the bottom layer fractionates the other components of the feed mixture.

Although the VPSA system 60 is described below as having twelve adsorbent beds 64, the VPSA system 60 may include two or more adsorbent beds 64 and preferably has four to sixteen adsorbent beds 64. In an alternative embodiment, the body 62 may be replaced with multiple adsorption vessels. Each adsorbent bed 64 includes a feed end 65 and a product end 67.

Each adsorbent bed 64 is sealed off with an adsorbent bed cap 92. In the preferred embodiment, the adsorbent bed caps 92 are retained in place by the product head 96. An optional compression spring and filtering means (not shown) are used to keep a packed particulate adsorbent bed fixed during operation. If a monolith is used instead, springs and filtering means are not required.

The adsorbent bed cap 92 is made with a flow control orifice 94 that controls product gas flow out of the adsorbent bed and purge gas flow into the adsorbent bed. Alternately, the flow control orifice 94 may be replaced by a check valve (not shown) that only allows the flow of product gas out of the adsorbent bed 64. Another alternative is to use both a flow control orifice 94 and a check valve in parallel as suggested in FIGS. 1 and 2 for the discrete valved system.

The adsorbent bed body 62 also has a feed-air passage 66 and a vacuum passage 68 formed therein. Feed-air port 88 and vacuum port 90 are attached to the passages 66 and 68 respectively. Similar to the system 10 described above with respect to FIG. 1, feed air may be supplied by a compressor to the feed-air port 88 through a compressor and a vacuum force may be imparted to the vacuum port 90 by a vacuum pump. The compressor and vacuum pump are preferably integrated and operate from a single motor.

Product gas is delivered into a product tank 98 integrated with the VPSA system 60. The product tank 98 is defined by the product head 96 and the end of the adsorbent bed body 62. Flow control orifices 94 directly communicate with the product tank 98. Product gas flows out of the VPSA system 60 via a product outlet port 86.

Near the feed ends 65 of the adsorbent beds 64 are ports 70 and slots 72 that serve to connect the adsorbent beds 64 to the rotary valve assembly 61. In another embodiment, the ports 70 and slots 72 may be used to connect the product ends 67 of the adsorbent beds 64 to the rotary valve assembly 61. The ports 70 and slots 72 may also exist near the product ends 67 of the adsorbent beds 64.

Figure 5:
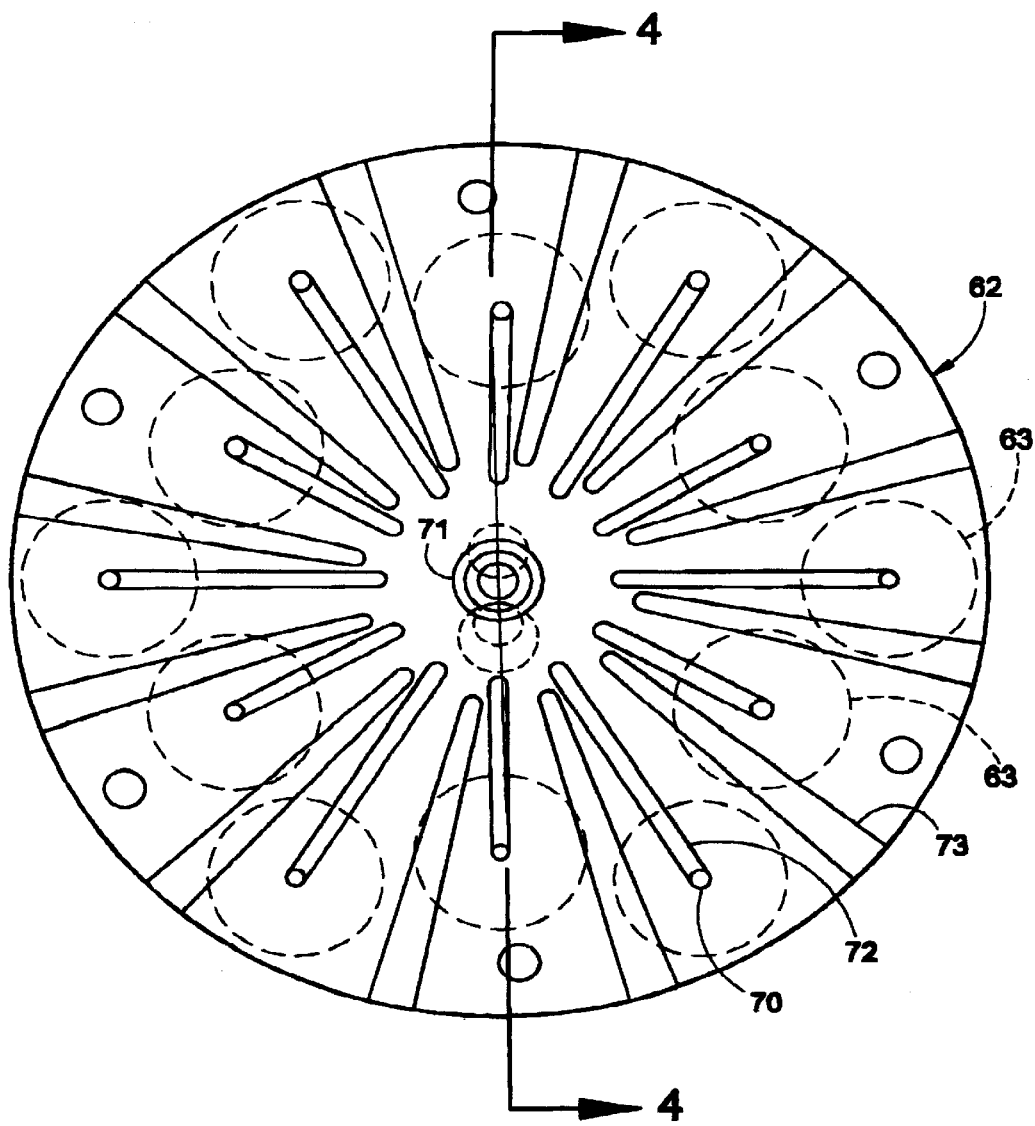
FIG. 5 is an end view of an embodiment of an adsorbent bed body used in the VPSA system of FIG. 4 taken along line 5—5 in FIG. 4.
Figure 6B:
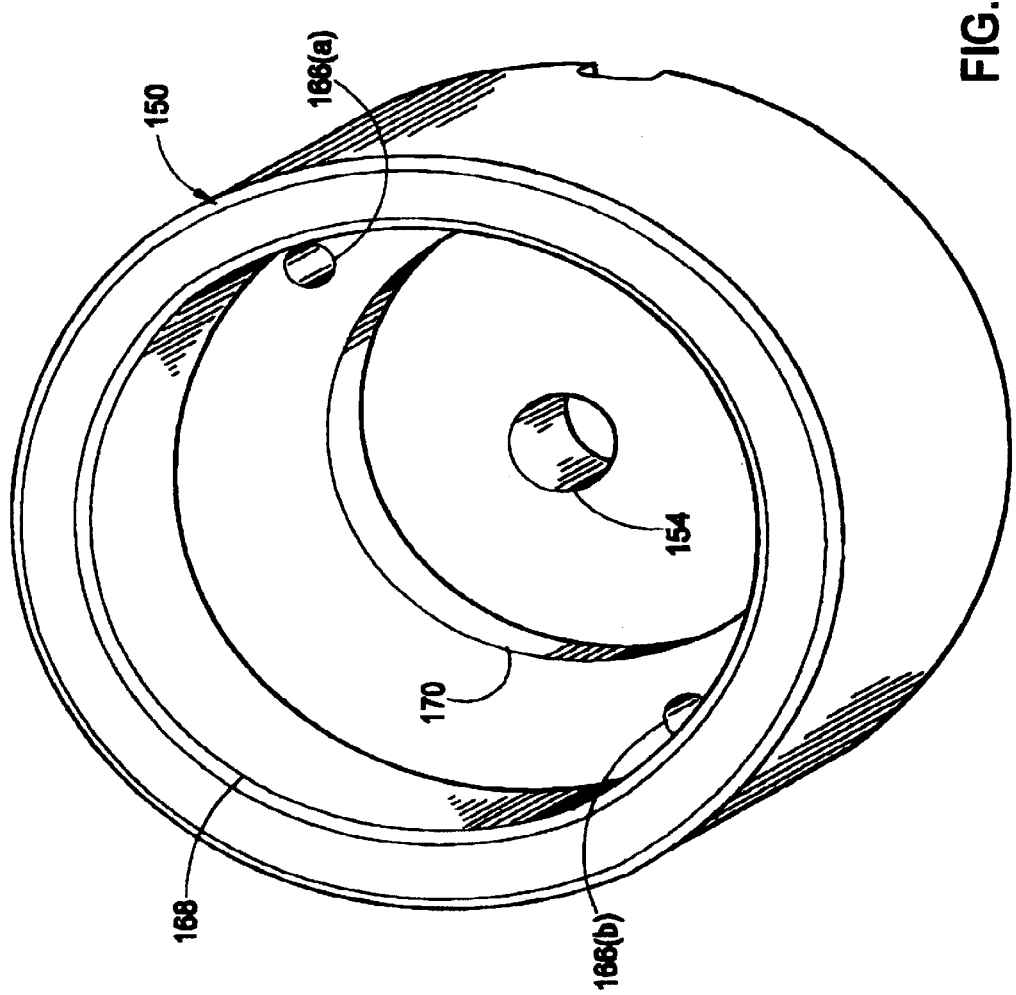
FIG. 6B is a top perspective view of the rotor shoe illustrated in FIG. 6A.
Figure 6C:
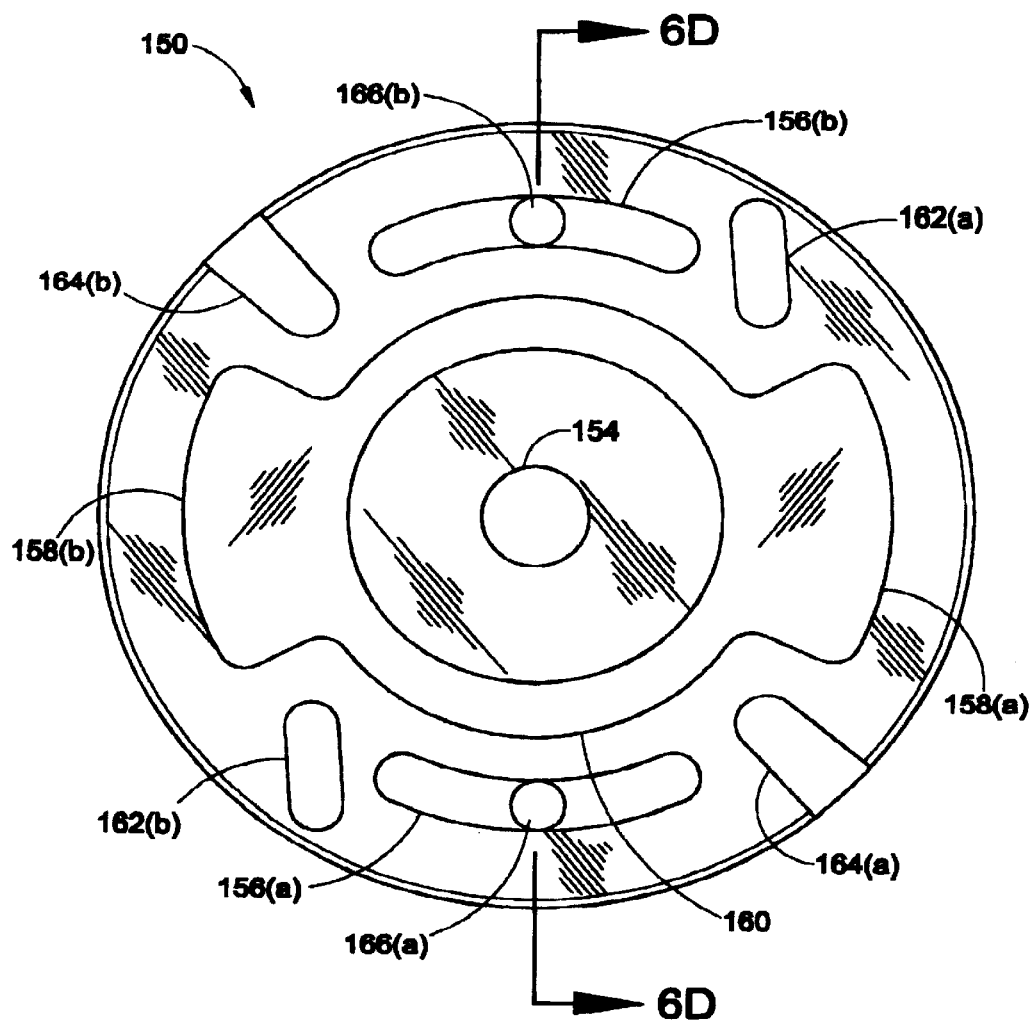
FIG. 6C is a bottom plan view of the rotor shoe illustrated in FIGS. 6A, 6B.
Figure 6D:
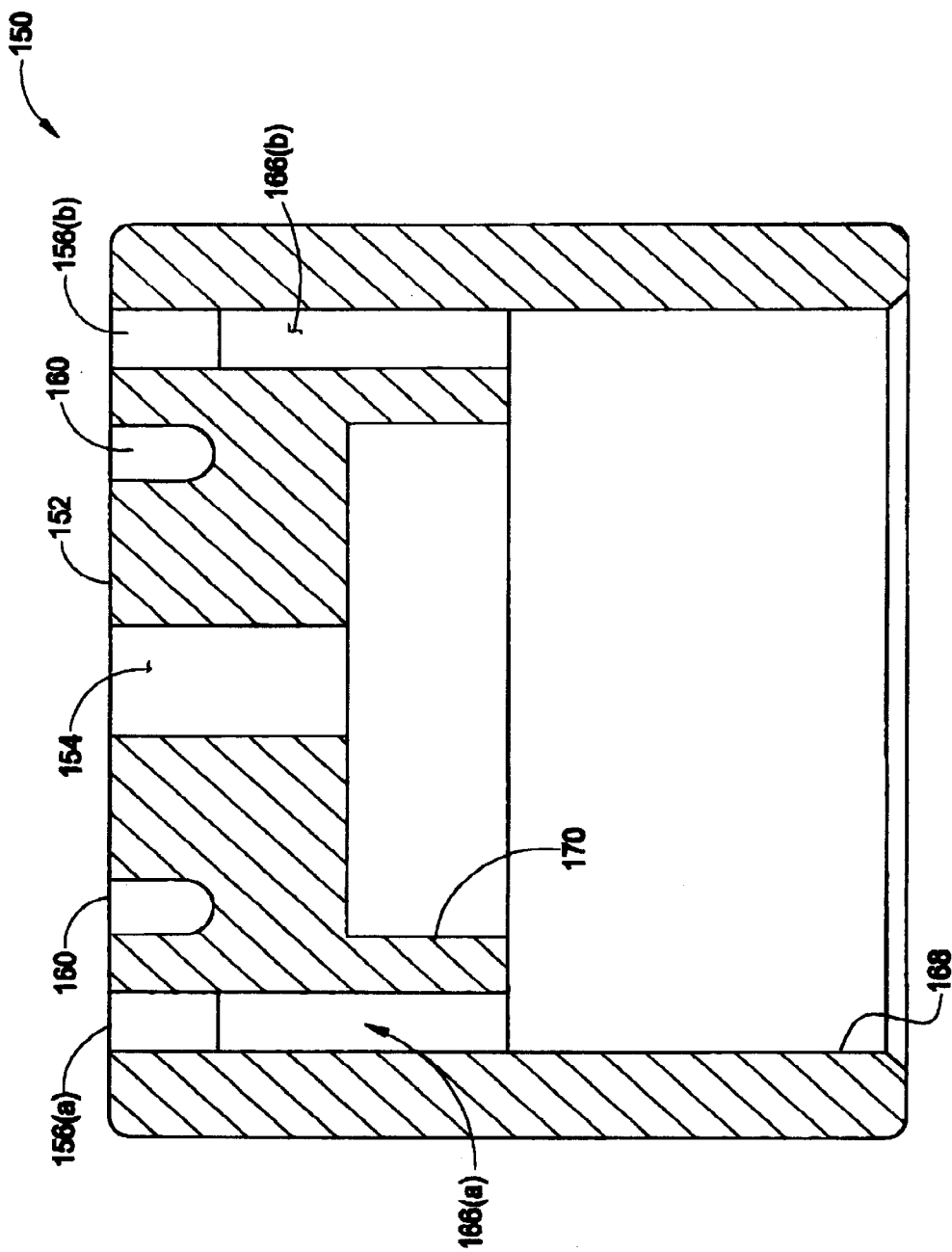
FIG. 6D is a cross-sectional view of the rotor shoe taken along lines 6D—6D of FIG. 6C.

A plate 74 is mounted to the adsorbent bed body 62 with threaded fasteners (not shown) and a suitable sealant or gasket to form a manifold 75 that communicates a port plate or first valve member 100 of the rotary valve assembly 61 to the adsorbent beds 64 and vent-up passages 73 (FIG. 5). With reference to FIG. 5, the vent-up passages 73 are slots that connect vent-up ports 104 (FIG. 7) in the port plate 100 to the ambient fluid mixture (e.g., atmospheric air) surrounding the VPSA system 60. With reference back to FIG. 4, an annular space 77 receives a vent-up filter 78. The filter 78 includes a strip of open cell foam to filter the air that flows into the adsorbent beds 64 via the vent-up passages 73 in the adsorbent bed body 62.

Although the manifold 75 is shown as having a single-piece construction, the manifold 75 may be comprised of a top member and a bottom member that form a two-piece manifold construction. The port plate 100 is mounted by an adhesive to the plate 74. A rotor shoe or second valve member 150 of the rotary valve assembly 61 is held in axial contact and radial alignment with the port plate 100 by a rotor shaft 80, compression spring 82 and axial and radial bearing surfaces formed between the rotor shaft 80 and a valve cover 76. The valve cover 76 retains the rotary valve assembly 61 to the adsorbent bed body 62. A motor 84 mounts to the valve cover 76 and engages the rotor shaft 80 to cause the rotation of the rotor shoe 150. A compression spring 82 may be used to bias the rotary valve shoe 150 against the valve port plate 100. The spring 82 may act as the only balancing force provided upon initial start-up of the VPSA system 60.

Vent-down gas flows out of an interior space 79 formed between the valve cover 76 and the valve assembly 61 through a porous metal filter element or equivalent (not shown). The vent-down gas flow and vent-up gas flow are isolated from each other so that vent-down gas does not contaminate vent-up gas entering the adsorbent bed 64.

Figure 7:
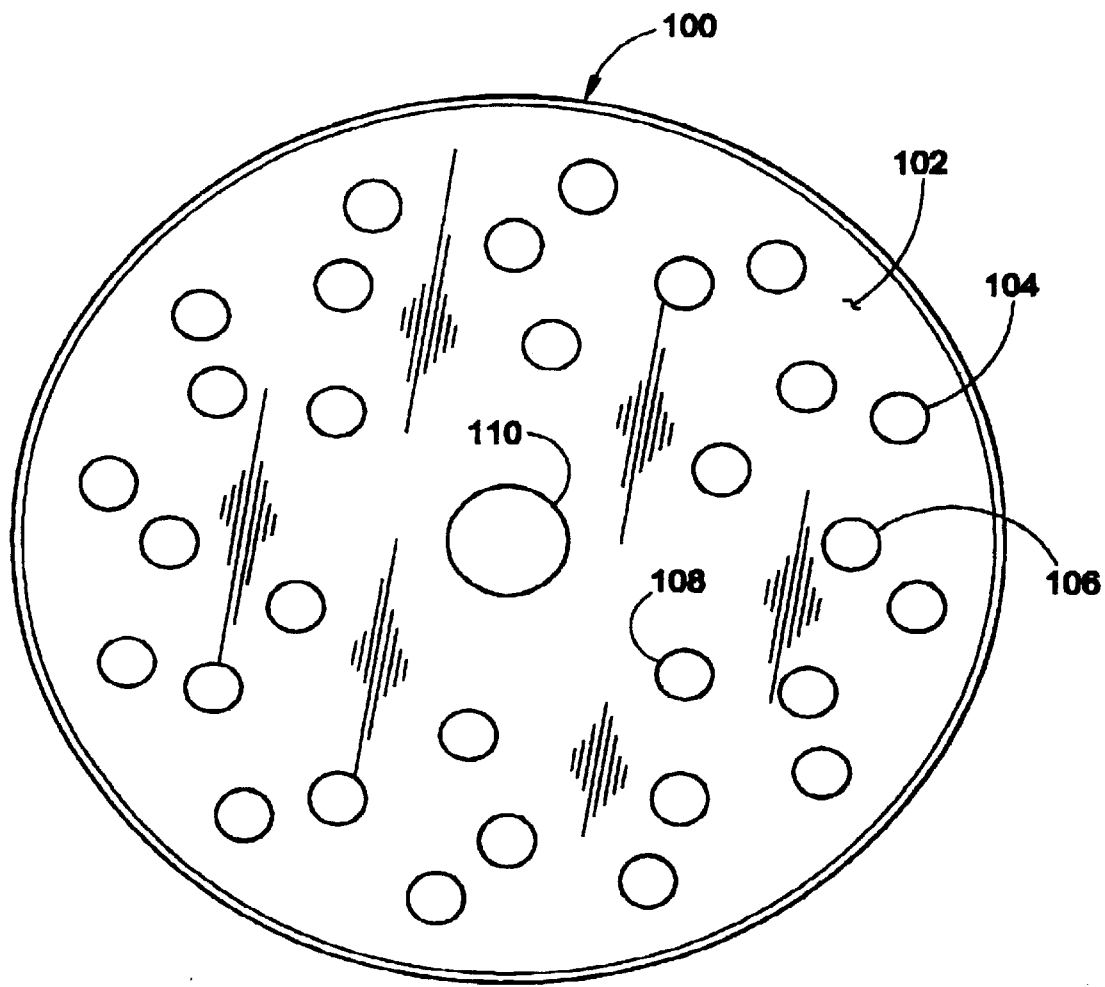
FIG. 7 is a top plan view of an embodiment of a port plate of a rotary distribution valve assembly used in the VPSA system of FIG. 4.

With reference to FIG. 7, the port plate 100 will now be described in more detail. The port plate 100 is preferably made of silicon carbide, includes a circular disk-like shape, and has a very flat, smooth engagement surface 102. The engagement surface 102 is preferably lapped flat within about 2 light bands (0.000020 inches) to form a low-friction, long wearing surface 102. This allows the port plate 100 to form a fluid-tight seal when pressed together with the rotor shoe 150. The port plate 100 may be constructed of a material other than silicon carbide. For example, the port plate 100 may be made of a ceramic material. Further, the port plate 100 may have a configuration other than circular. For example, the port plate 100 may have a polygonal configuration.

The port plate 100 preferably includes a number of concentric, symmetric rings of ports that connect to the manifold 75 to direct the flow of various fluids during the cycle. The ports preferably extend completely through the valve port plate 100 in a direction generally perpendicular to the engagement surface 102. Although the ports are generally shown as having a circular configuration, it will be readily apparent to those skilled in the art that the ports may have alternative configurations such as, but not by way of limitation, square-shaped, sector-shaped, and polygonal-shaped. The ports may also extend through the port plate 100 at a variety of angles. Preferably, all of the ports of each type have the same configuration.

Vent-up ports 104 form an outer ring of ports. The vent-up ports 104 connect to the ambient fluid mixture, e.g., atmospheric air, to supply fluid for the process step #4 (FIG. 2) through vent-up passages 73 (FIG. 5). Adsorbent bed ports 106 connect to the adsorbent beds 64 through the manifold 75 via slot 72 and hole 70. Vacuum ports 108 connect with the vacuum source through the manifold 75 and via the annular slot 71 (FIG. 5) and vacuum passage 68. A feed air port 110 connects with the source of pressurized feed fluid through the manifold 75 and via feed-air passage 66.

The number of each type of port depends on certain design considerations, and may be different than that shown. The number of adsorbent bed ports 106 preferably matches the number of adsorbent beds 64 used in the process. The vent-up port 104 is paired with each adsorbent bed port 106, so there is an equal number of vent-up ports 104 as adsorbent bed ports 106. In an alternative embodiment, the number of vent-up ports 104 and adsorbent bed ports 106 may not match the number of adsorbent beds 64, the number may be more or less. The number of vacuum ports 108 is driven by the flow area required for reasonable pressure drop through the valve assembly 61. There is preferably only one feed air port 110.

In alternative embodiments, the relative location of the ports may vary. For example, but not by way of limitation, the adsorbent bed ports 106 may be the outermost ring instead of the vent-up ports 104.

With reference to FIGS. 6A–6D, the rotor shoe 150 will now be described in more detail. The rotor shoe 150 is preferably circular in configuration and is made of a carbon graphite material. An engagement surface 152 of the rotor shoe 150 is preferably lapped flat similar to the port plate engagement surface 102 to form a low-friction, long-wearing surface 152. As discussed above, this allows the rotor shoe 150 to form a fluid-tight seal when pressed together with the port plate 100.

The rotor shoe 150 may be constructed of a material other than carbon graphite. For example, the rotor shoe 150 may be made of a ceramic or plastic material. Further, the rotor shoe 150 may have a configuration other than circular. For example, the rotor shoe 150 may have a polygonal configuration.

The following symmetrically disposed ports and channels are positioned in the engagement surface 152 of the rotor shoe 150 for communicating with the ports of the port plate 100 to direct the flow of various fluids during the cycle: a central feed air passage 154, feed air channels 156(*a*), (*b*), vacuum channels 158(*a*), (*b*), vacuum connection channel 160, vent-up channels 162(*a*), (*b*), and vent-down channels 164(a), (b). It will be readily apparent to those skilled in the art that the ports and channels may have a configuration and/or relative locations other than that shown in FIG. 6A. Feed air channel connecting passages 166(a), (b) (FIG. 6B) supply feed air to feed air channels 156(a), (b). A reverse side of the rotor shoe 150 (FIG. 6B) has a pressure balance bore 168 that is sized to maintain a pressure force on the rotor shoe 150 that overcomes any separating pressure forces at the engagement surface 152 of the rotor shoe 150 so that good contact is made between the engagement surface of the rotor shoe 150 and the engagement surface 102 of the port plate 100. There is also an eccentric drive bore 170 that engages with the drive shaft to rotate the rotor shoe 150. The symmetrical face design of the valve port plate 100 and rotor shoe 150 help to avoid tipping of the rotor shoe 150 caused by uneven pressure distribution in the valve assembly 61.

Although not shown, conventional equipment may be used to monitor and automatically regulate the flow of product fluid from the system 60 so that it can be fully automated to run continuously in an efficient manner.

The rotary valve assembly 61 will now be described in use to bring about the four process steps of the cycle. It should be noted that the rotary shoe 150 turns in one direction in order to bring about the process steps at a particular adsorbent bed 64 in the correct order. In the embodiment shown, the rotor shoe 150 rotates clockwise as shown by the arrow in FIG. 6A (when viewing the engagement surface 152 of the rotor shoe 150). Of course, the relative position of the ports 162 and 164 could be interchanged to allow counter-clockwise rotation if that was desirable. The rotary valve shoe 150 may turn in a continuous way or in a step way. Preferably, the rotary valve shoe 150 rotates continuously, at a constant rate. If the valve shoe 150 is controlled to move in a stepped fashion, stepped movement may be controlled by a controller based on one or more sensed pressure readings near or at the feed end and/or product end 67 of the adsorbent beds 64.

In alternative embodiments, the port plate 100 may rotate instead of the shoe 150 or both the shoe 150 and the port plate 100 may rotate (e.g., the shoe 150 may rotate at a faster rate than the port plate 100).

Further, although the rotary valve assembly 61 is preferably a face-seal type rotary valve assembly as described, in an alternative embodiment, the rotary valve assembly may be a cylindrical-type rotary valve assembly. In a cylindrical-type rotary valve assembly, an outer peripheral surface of a first valve member communicates with an inner peripheral surface of a second valve member to control the distribution of fluids.

Still farther, the rotary valve assembly 61 may be a face-seal type rotary valve assembly where some of the fluid routing does not occur in the engagement surface of the rotary valve shoe 150. For example, some fluid routing may occur along a periphery, outer circumference, or sidewall of the rotary valve shoe 150 underneath a ring that is shrunk or bonded onto the sidewall of the rotary valve shoe 150.

Process step 1 is carried out when the feed air channels 156(a) or (b) are positioned over an adsorbent bed port 106 in the port plate 100. Feed air channels 156(a),(b) are supplied with feed air via the feed air channel connecting passages 166(a),(b). The reverse side of the rotor shoe (FIG. 6B) is filled with feed air supplied via the central feed air passage 154 from the feed air port 110 in the port plate 100.

Process step 2 is carried out when the vent-down channels 164(a) or (b) are positioned over an adsorbent bed port 106 in the port plate 100. Fluid from the adsorbent bed 64 is then able to vent into the space 79 surrounding the rotary valve assembly 61 and out of the system 60 through a filter.

Process step 3 is carried out when vacuum channels 158(a) or (b) are positioned over an adsorbent bed port 106 in the port plate 100. Vacuum is supplied to the vacuum channels 158(a) and (b) via the vacuum connection channel 160. The vacuum connection channel 160 is in alignment with the vacuum ports 108 in the port plate 100.

Process step 4 is carried out when the vent-up channels 162(a) or (b) are positioned over an adsorbent bed port 106 in the port plate 100. The vent-up channel 162(a), (b) aligns with both the adsorbent bed port 106 and the vent-up port 104 in the port plate 100, allowing fluid communication between the two ports 104, 106.

The ratio of the duration of steps 1 and 3 to steps 2 and 4 is preferably about 3:1. This low-pressure ratio along with the vent-up feature described herein reduces the power consumption of the VPSA system and, thus, enables its use as part of a portable oxygen concentrator system. Although the preferred ratio of the duration of steps 1 and 3 to steps 2 and 4 is about 3:1, the ratio may vary from about 1:1 to 10:1, and more preferably, about 1.5:1 to 5:1. The ratio of the duration of step 1 to step 3 is preferably about 1:1. However, the ratio of step 1 to step 3 may vary from about 1:2 to 2:1.

The VPSA method of the present invention modifies prior-art vacuum-pressure swing adsorption cycles. Instead of the prior-art back-filling step that puts purified product gas into the adsorbent bed either co-currently or counter-currently, the VPSA method of the present invention includes a vent-up step (process step #4, FIG. 2). Prior art valve arrangements were more complex because active valves were used at the product ends of the adsorbent beds to allow for the back-filling step. The complexity of the prior art valve arrangements is avoided with the present invention. There are no active valves at the product end of the adsorbent beds. Elimination of valves that connect the product end of the adsorbent beds with the feed end of the adsorbent beds ensures that there cannot be any leaks from the feed gas into the product gas. This in turn ensures that product purity will not be adversely affected by this leakage. The present invention also avoids using a large quantity of product gas to back-fill.

The vent-up step reduces the power consumed because a portion of the fluid flows normally passing through the compressor is by-passed around the compressor, reducing the amount of fluid that must be handled through the compressor. This provides at least three advantages. The first advantage is that power input to the compressor is less since less fluid is handled. The second advantage is that the compressor can be smaller since its required capacity is lower for the same product output. The third advantage is that overall energy efficiency of the system is improved.

It should be noted that the vent-down step operates in a similar way, lowering power input to the vacuum pump, allowing the vacuum pump to be of a smaller size and increasing overall system efficiency yet further.

The VPSA system 60 including the rotary valve assembly 61 further advances the invention. The rotary distribution valve greatly simplifies the routing of fluid flows while packing the fluid distribution function into a very small space. The rotary valve assembly 61 uses very little power and has very high reliability.

These advantages, in turn, make it feasible to produce fluid fractionators small enough that they can be used for, before unheard of, purposes such as for portable oxygen gas production.

Although some of the elements described herein are referred to by order, i.e., "first," "second," etc., it should be noted that this is done to facilitate the reader's understanding of the invention and is not intended to limit the invention.

The foregoing description and drawings were given for illustrative purposes only, it being understood that the invention is not limited to the embodiments disclosed, but is intended to embrace any and all alternatives, equivalents, modifications and rearrangements of elements or steps falling within the scope of the invention as defined by the following claims.

I claim:

1. A vacuum-pressure swing adsorption process for the separation of components of a fluid mixture, comprising:
   (a) transferring a fluid mixture through an adsorbent bed at an elevated pressure $P_h$ so as to produce a purified product fluid;
   (b) venting the adsorbent bed down to an ambient fluid pressure $P_a$;
   (c) applying a vacuum force to the adsorbent bed to bring the adsorbent bed to a reduced pressure $P_l$;
   (d) venting the adsorbent bed up to the ambient fluid pressure $P_a$.

2. The method of claim 1, wherein step (b) includes venting the adsorbent bed to ambient fluid pressure $P_a$ after step (a) is complete and simultaneously purging the adsorbent bed with a fraction of the product fluid produced.

3. The method of claim 2, wherein step (c) includes evacuating the adsorbent bed with a vacuum pump at the reduced pressure $P_l$ after step (b) is complete and simultaneously purging the adsorbent bed with a fraction of the product fluid produced.

4. The method of claim 3, wherein step (d) includes venting the adsorbent bed up to an ambient fluid pressure $P_a$ after step (c) is complete and simultaneously filling the adsorbent bed with a fraction of the product fluid produced.

5. The method of claim 1, wherein the process is performed with a discrete-valve VPSA system.

6. The method of any of claim 5, wherein the discrete-valve VPSA system includes a discrete valve assembly controlled based on sensed pressure at or near the adsorbent bed.

7. The method of claim 1, wherein the process is performed with a rotary valve VPSA system.

8. The method of claim 1, wherein the process is performed with a face-seal type, rotary valve VPSA system.

9. The method of claim 8, wherein the rotary valve VPSA system includes a rotary valve that, when in use, rotates continuously at a constant rate.

10. The method of claim 8, wherein the rotary valve VPSA system includes a rotary valve that is controlled to operated in stepped fashion based on sensed pressure at or near an adsorbent bed.

11. The method of claim 1, wherein the vacuum-pressure swing adsorption process separates oxygen gas from air.

12. The method of claim 11, wherein the ratio of the duration of steps (a) and (c) to steps (b) and (d) is about 3:1.

13. The method of claim 11, wherein the ratio of the duration of steps (a) and (c) to steps (b) and (d) ranges from about 1.5:1 to 5:1.

14. The method of claim 1, wherein the process is performed with a portable oxygen concentrator.

15. The method of claim 14, wherein the ratio of the duration of steps (a) and (c) to steps (b) and (d) is about 3:1.

16. The method of claim 14, wherein the ratio of the duration of steps (a) and (c) to steps (b) and (d) ranges from about 1.5:1 to 5:1.

17. The method of claim 1, wherein the process is performed with a battery-powered concentrator.

18. The method of claim 17, wherein the ratio of the duration of steps (a) and (c) to steps (b) and (d) is about 3:1.

19. The method of claim 17, wherein the ratio of the duration of steps (a) and (c) to steps (b) and (d) ranges from about 1.5:1 to 5:1.

20. The method of claim 1, wherein the ratio of the duration of step (a) to step (c) is about 1:1.

21. The method of claim 1, wherein the ratio of the duration of step (a) to step (c) ranges from about 1:2 to 2:1.

22. The method of claim 1, wherein the ratio of the duration of steps (a) and (c) to steps (b) and (d) is about 3:1.

23. The method of claim 1, wherein the ratio of the duration of steps (a) and (c) to steps (b) and (d) ranges from about 1:1 to 10:1.

24. The method of claim 1, wherein at least two of the durations of steps (a)–(d) are unequal.

25. The method of claim 1, wherein at least three of the durations of steps (a)–(d) are unequal.

26. The method of claim 1, wherein all of the durations of steps (a)–(d) are unequal.

27. The method of claim 1, wherein the venting up step of step (d) includes filtering incoming ambient fluid.

28. The method of claim 1, wherein the ambient fluid pressure $P_a$ is atmospheric pressure.

29. The method of claim 1, wherein compressed air supplied for the transferring step of step (a) and vacuum pressure for the vacuuming step of step (c) are created by an integrated vacuum pump and compressor operating from a single motor.

30. A vacuum-pressure swing adsorption system for the separation of components of a fluid mixture, comprising:
   a plurality of adsorbent beds; and
   a valve assembly to provide valving action to transfer a fluid mixture through each adsorbent bed at an elevated pressure $P_h$ so as to produce a purified product fluid, vent the adsorbent bed down to an ambient fluid pressure $P_a$, cause a vacuum force to be applied to the adsorbent bed to bring the adsorbent bed to a reduced pressure $P_l$ and vent the adsorbent bed up to the ambient fluid pressure $P_a$.

31. The system of claim 30, wherein the valve assembly provides valving action to allow the adsorbent bed to vent to ambient fluid pressure $P_a$ and to allow the adsorbent bed to be purged with a fraction of product fluid produced.

32. The system of claim 31, wherein the valve assembly provides valving action to allow the adsorbent bed to be evacuated with a vacuum pump at the reduced pressure $P_l$ and to allow the adsorbent bed to be purged with a fraction of product fluid produced.

33. The system of claim 32, wherein the valve assembly provides valving action to allow the adsorbent bed to vent up to an ambient fluid pressure $P_a$ and to allow the adsorbent bed to be filled with a fraction of product fluid produced.

34. The system of claim 30, wherein the system is a discrete-valve VPSA system.

35. The system of claim 34, wherein the valve assembly includes six two-way valves.

36. The system of claim 34, wherein the valve assembly includes two three-position, four-way, spring centered valves.

37. The system of claim 34, wherein the valve assembly of the discrete-valve VPSA system is a discrete valve assembly and the VPSA system further includes a controller adapted to control the discrete valve assembly based on sensed pressure at or near the adsorbent beds.

38. The system of claim 30, wherein the system is a rotary valve VPSA system.

39. The system of claim 38, wherein the system is a face-seal type, rotary valve VPSA system including a rotor shoe with an engagement surface and a port plate with an engagement surface, the engagement surface of the rotor shoe in rotational engagement with the engagement surface of the port plate for providing valving action.

40. The system of claim 39, wherein the rotary valve rotates continuously at a constant rate.

41. The system of claim 39, wherein the rotary valve VPSA system further includes a controller that controls the rotary valve to operate in stepped fashion based on sensed pressure at or near the adsorbent beds.

42. The system of claim 30, wherein the ratio of the absolute pressure of the elevated pressure $P_h$ and the reduced pressure $P_l$ to the ambient fluid pressure $P_a$ is about 3:1.

43. The system of claim 30 wherein the ratio of the absolute pressure of the elevated pressure $P_h$ and the reduced pressure $P_l$ to the ambient fluid pressure $P_a$ ranges from about 1.5:1 to 5:1.

44. The system of claim 30, wherein the vacuum-pressure swing adsorption system separates oxygen gas from air.

45. The system of claim 44, wherein the ratio of the absolute pressure of the elevated pressure $P_h$ and the reduced pressure $P_l$ to the ambient fluid pressure $P_a$ is about 3:1.

46. The system of claim 44, wherein the ratio of the absolute pressure of the elevated pressure $P_h$ and the reduced pressure $P_l$ to the ambient fluid pressure $P_a$ ranges from about 1.5:1 to 5:1.

47. The system of claim 30, wherein the vacuum-pressure swing adsorption system is a portable oxygen concentrator.

48. The system of claim 47, wherein the ratio of the absolute pressure of the elevated pressure $P_h$ and the reduced pressure $P_l$ to the ambient fluid pressure $P_a$ is about 3:1.

49. The system of claim 47, wherein the ratio of the absolute pressure of the elevated pressure $P_h$ and the reduced pressure $P_l$ to the ambient fluid pressure $P_a$ ranges from about 1.5:1 to 5:1.

50. The system of claim 30, wherein the system is battery-powered.

51. The system of claim 50, wherein the ratio of the absolute pressure of the elevated pressure $P_h$ and the reduced pressure $P_l$ to the ambient fluid pressure $P_a$ is about 3:1.

52. The system of claim 50, wherein the ratio of the absolute pressure of the elevated pressure $P_h$ and the reduced pressure $P_l$ to the ambient fluid pressure $P_a$ ranges from about 1.5:1 to 5:1.

53. The system of claim 30, further including a filter to filter incoming vent-up ambient fluid.

54. The system of claim 30, further including an integrated vacuum pump and compressor operating from a single motor to supply compressed air to the system and to cause vacuum pressure in the system.

55. The system of claim 30, wherein the adsorbent bed includes Li-X sieve material.

56. The system of claim 30, wherein the adsorbent bed includes Ca-X sieve material.

57. The system of claim 30, wherein the adsorbent bed is a layered sieve bed.

58. The system of claim 30, wherein the adsorbent bed includes a product end and a feed end, the valve assembly adapted to control flow through the product end, feed end, or both.

59. The system of claim 30, wherein the adsorbent bed includes a product end and a feed end, the valve assembly located at least in part near the product end, the feed end, or both.

* * * * *